May 11, 1937.   L. R. MARTIN   2,080,055
PHOTOMETRIC APPARATUS
Filed July 6, 1935
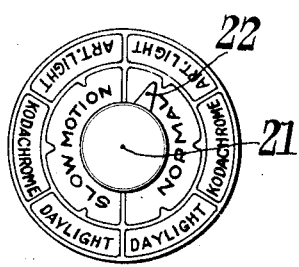
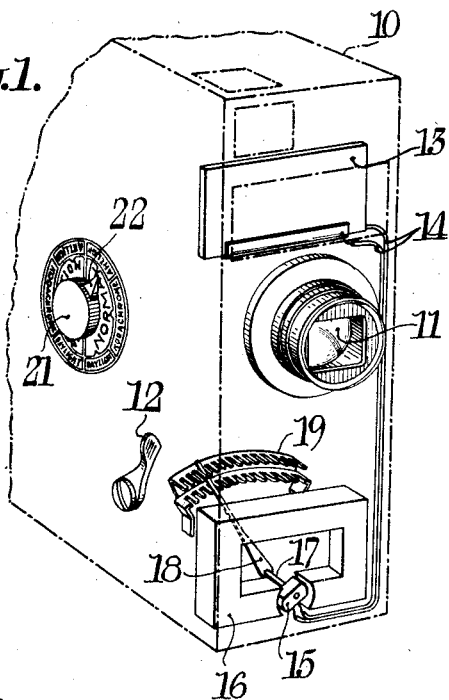
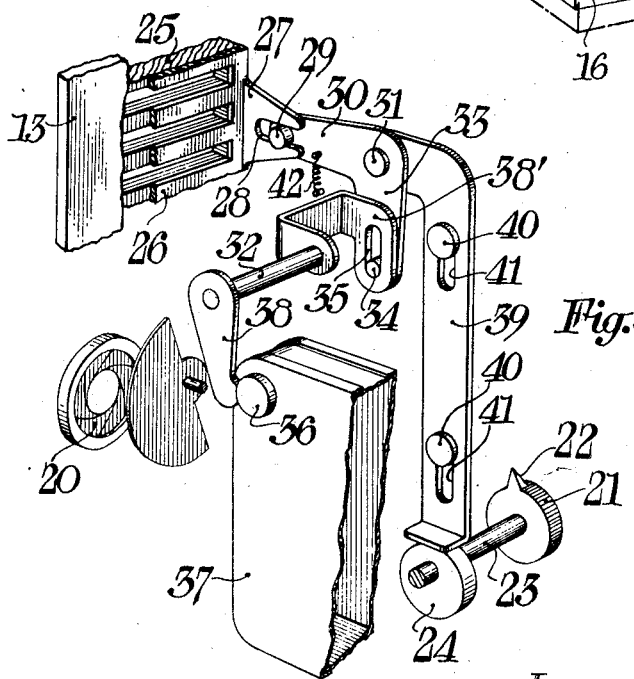
INVENTOR:
Lawrence R. Martin,
BY Newton N. Perrins
Holla N. Carter
ATTORNEYS.

Patented May 11, 1937

2,080,055

UNITED STATES PATENT OFFICE 2,080,055

PHOTOMETRIC APPARATUS

Lawrence R. Martin, Rochester, N. Y., assignor, by mesne assignments, to Eastman Kodak Company, Jersey City, N. J., a corporation of New Jersey Application July 6, 1935, Serial No. 30,064

3 Claims. (Cl. 88—16)

My present invention relates to photographic apparatus and particularly to motion picture cameras provided with light meter controlled diaphragm adjusting means of the general type described and claimed in applications Serial No. 715,284 filed March 13, 1934 and Serial No. 740,469 filed August 18, 1934 in the name of Joseph Mihalyi and assigned to the same assignee as is the present invention.

In the apparatus described in the above applications, a light sensitive cell receiving light reflected by a subject to be photographed actuates a meter element, the pointer of which is employed as a physical stop for determining the setting to which the camera diaphragm is adjusted. In order to insure the proper diaphragm setting to obtain the correct exposure under different lighting conditions, for different exposure times which are employed and for the speed of the emulsion used the diaphragm setting mechanism may be adjusted in accordance with any or all of such variable factors.

In particular, such adjustment may be accomplished by varying the quantity of light falling on the light sensitive cell and it is an object of my invention to provide an arrangement whereby the relative exposure of the cell may be varied with great accuracy and in strict accordance with the factors involved in the film and shutter speeds.

Another object of my invention is the provision of a mechanical arrangement which is so constructed that it will produce at all times a uniform proportional variation in the exposure of the cell for any setting of any and all of the variable factors.

A further object of my invention is to provide a device of this type which is mechanically simple, easy and economical to manufacture and which is sturdy and reliable in operation.

A further object of my invention is to provide a camera having a shutter speed control lever the setting of which determines the connection between an adjustable member and its adjusting element.

Other objects and advantages of my invention will become apparent from the following description when read in connection with the accompanying drawing in which:

Fig. 1 is a perspective view partly in outline of the front portion of a motion picture camera to which my invention may be applied;

Fig. 2 illustrates a detail of shutter speed adjusting dial; and

Fig. 3 is a perspective view showing the essential parts of one embodiment of my invention as applied to a motion picture camera of the magazine type.

In Fig. 1 is shown a motion picture camera having a casing 10, shown in outline, which carries the usual objective 11, and release lever 12. The camera 10 is provided with a diaphragm adjusting mechanism, as described in the above Mihalyi applications, which includes a light sensitive cell 13 connected by leads 14 to a coil 15 which forms with a magnet 16 a suitable meter element. The coil 15 is mounted on a shaft 17 which is provided with a pointer member 18 as is well known. For a complete understanding of my invention it is sufficient to state that the response of the cell 13 causes the pointer 18 to assume a position corresponding to the light received by the cell 13 after which movement of the camera release lever 12 initially moves a toothed member 19 to entrap the pointer 18 in its deflected position and then adjusts the diaphragm 20 to a setting determined by the position of the pointer. Final movement of the lever 12 releases the camera mechanism to make a series of exposures in any well known manner.

For the purpose of illustration I have chosen to show my invention as applied to a device for varying the exposed area of the cell. It will be understood however that it is not limited to such but is applicable also to devices for varying the intensity of the light falling on the cell or any combination of such devices for producing a variation in the exposure of the cell.

The camera 10 to which the arrangement of my invention is to be applied is provided with any suitable mechanism for adjusting the speed at which the shutter will be operated. For the purpose of illustration I have shown a control knob 21 provided with a pointer 22 which indicates the setting of the speed mechanism. By reference to Fig. 2 is will be noted that in addition to the two shutter speeds labeled as Normal and Slow motion, each speed range is divided into a number of sectors corresponding to other factors which may influence the exposure such as daylight, kodachrome and artificial light. This knob 21 is preferably mounted on a suitable shaft 23 which in addition to the speed controlling member (not shown) is provided with a cam 24 which functions to adjust the exposed area of the cell 13 in a manner to be described below.

For limiting the light falling on the cell 13 to the vertical angle of the light accepted by the camera lens 11, there is mounted in front of the cell 13 a suitable grid baffle 25. Between the baffle 25 and the cell 13 is positioned a shutter grid 26 having openings corresponding to those in the baffle 25. The grid 26 is mounted in any suitable manner (not shown) for vertical movement, which movement will vary the exposed area of the cell 13 as will be obvious from an inspection of Fig. 3.

The arrangement comprising my invention has for its purpose the production of a uniform proportional variation in the exposed area of the cell 13 following any given adjustment of either of two independent factors. In the preferred embodiment shown in Fig. 3, the factors for which the cell area is varied are the sensitivity of the film, the time interval of an individual exposure and the type of illumination employed for lighting the subject to be photographed. The grid shutter 26 is provided with a rearwardly extending bifurcated ear 27 forming an open slot 28 in which is positioned a pin 29 for imparting vertical movement to the shutter 26. The pin 29 is carried by an arm 30 of a bell crank mounted on a pivot 31 and is adapted to be rotated about the pivot 31 upon rotation of a shaft 32 by means of a slot and pin connection between the shaft 32 and the other arm 33 of the bell crank. This slot and pin connection comprises a pin 34 carried by the arm 33 and projecting into a slot 35 formed in a member 36' secured to the shaft 32. The shaft 32 is adapted to be rotated in any suitable manner to an angular position corresponding to the sensitivity of the film being used and due to the eccentricity of the pin 34 with respect to the shaft 32, the bell crank will be rotated about its pivot 31 a corresponding amount to adjust the vertical position of the grid shutter 26 and thereby vary the exposed area of the cell 13. In the embodiment shown in Fig. 3 as applied to a magazine camera, the positioning of the shaft 32 is accomplished by means of an embossing 36 whose position or size is characteristic of the speed of the film contained in a magazine 37. A depending lever arm 38 carried by the shaft 32 is positioned to be engaged by the embossing 36 when the magazine 37 is placed in the camera. It is thus seen that insertion of the magazine 37 automatically varies the exposed area of the cell 13 in accordance with the sensitivity of the film in the magazine.

Another factor taken into account is the shutter speed i. e. the exposure time, and vertical adjustment of the grid shutter 26 in accordance with this or some other factor is secured by mounting the bell crank pivot 31 on a moveable member 39 the lower end of which engages the cam 24 secured to the camera speed setting shaft 23. Movement of the member 39 by the cam 24 is confined to a vertical direction by any suitable means such as headed studs 40 extending through vertical slots 41 in the member 39. A coiled spring 42 secured to the arm 30 of the bell crank and anchored to the camera housing serves to bias the lever arm 38 to contact engagement with the magazine embossing 36 and to bias the member 39 to contact with the cam 24.

With the arrangement above described, a turning of the knob 21 to set the camera speed or to indicate the type of illumination employed, will through the cam 24 and the member 39 adjust the grid shutter 26 and at the same time will correspondingly adjust the eccentricity of the pin 34 with respect to the axis of the shaft 32 so that a given angular movement of the shaft 32 as determined by the magazine embossing 36 will adjust the shutter 26 an amount which is strictly proportional to the position of the pin 34 in the slot 35. Therefore, a given angular movement of the shaft 32 will produce the same relative variation in the exposed area of the cell 13 for all positions of the member 39 as determined by the cam 24 and conversely, any given movement of the member 39 will produce a uniform proportional variation in the exposed area of the cell 13 for any setting of the lever arm 38 as determined by the magazine embossing 36.

From the above description it will be apparent that I have provided an arrangement whereby two independent adjustments are mutually correlated so that any given adjustment of either will always produce the same proportional variation in the exposed area of the cell.

It is of course obvious that the adjusting mechanism of my invention may be employed in connection with any well known means for varying the quantity of light falling on the cell and will in each case be capable of producing the desired proportional variations in the exposure of the cell.

While I have described my invention as applied to a magazine type of motion picture camera it obviously is not limited thereto but may be used wherever it is desired to vary the exposure of a cell under the joint control of two or more independent adjustments. Various modifications of my invention will readily suggest themselves to persons skilled in the art without departing from the scope of my invention as set forth in the appended claims.

What I claim as new and desire to secure by Letters Patent of the United States is:—

1. In a photographic camera in which a light sensitive device determines the diaphragm setting, a light sensitive cell and means to vary the exposed area of the cell in accordance with two independent factors, said means comprising a fixed grating, a grid movable between the grating and the cell, a pivot, an arm mounted on the pivot and having one end connected to the grid, means for rotating the arm about said pivot in accordance with one of said factors, said last named means including a coupling whose mechanical advantage is dependent upon the position of said pivot, and means for adjusting the position of said pivot in accordance with the other of said factors.

2. A camera having a shutter, a diaphragm and means to govern the setting to which the diaphragm may be adjusted, said means including a light sensitive cell and an adjustable member for varying the amount of light falling on the cell, a rotatable cam having a plurality of surfaces disposed at positions corresponding to the shutter speeds of the camera, a rotatable shaft adapted to have its angular position correspond to the speed of the sensitive film to be used, a pivoted bell crank having one of its arms connected to said adjustable member and having its other arm operatively connected to said shaft so as to be rotated about its pivot upon adjustment of the angular position of said shaft, means engaging said cam for supporting said bell crank whereby rotation of the cam to bring different surfaces into engagement with said last mentioned means adjusts said member and also adjusts the relative positions of said crank and said shaft, and an adjustable linkage in the connection between said crank and said shaft adapted to be so altered by their relative adjustment that the angular movement imparted to said crank by a given angular movement of said shaft depends upon their relative positions.

3. A film camera designed for use with an interchangeable film magazine having an embossing characteristic of the sensitivity of the film contained in the magazine, a light sensitive cell carried by the camera, means in front of the cell for varying the exposure of the cell, a rotatable control member for said means positioned to engage and be rotated by the embossing when the magazine is placed in the camera, a manually actuatable control member for said means, and means connecting said control members to cause adjustment of one to produce a compensating adjustment of the other, said connecting means comprising an eccentric coupling whose eccentricity is determined by the position of the manually actuatable control member, whereby the amount of movement imparted to the means for varying the exposed area of the cell by a given angular movement of the rotatable control member depends upon the eccentricity of said coupling.

LAWRENCE R. MARTIN.